(12) United States Patent
Fontenot et al.

(10) Patent No.: US 8,943,131 B2
(45) Date of Patent: Jan. 27, 2015

(54) PREDICTIVE COLLABORATION MANAGEMENT

(75) Inventors: Nathan D. Fontenot, Georgetown, TX (US); Jeffrey David George, Austin, TX (US); Michael Thomas Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/172,250

(22) Filed: Jun. 29, 2011

(65) Prior Publication Data

US 2013/0007121 A1    Jan. 3, 2013

(51) Int. Cl.
   *G06F 15/16*   (2006.01)
   *G06Q 10/00*   (2012.01)

(52) U.S. Cl.
   CPC ..................... *G06Q 10/00* (2013.01)
   USPC ....................................................... 709/204

(58) Field of Classification Search
   USPC .......... 709/204–204, 212–219; 370/260–271; 707/769–780; 715/733–759; 706/10, 706/15–55; 700/48–55
   See application file for complete search history.

(56) References Cited

U.S. PATENT DOCUMENTS

| | | | |
|---|---|---|---|
| 5,704,017 A | 12/1997 | Heckerman et al. | |
| 2004/0003042 A1* | 1/2004 | Horvitz et al. | 709/204 |
| 2005/0034079 A1* | 2/2005 | Gunasekar et al. | 715/753 |
| 2006/0010206 A1* | 1/2006 | Apacible et al. | 709/205 |
| 2006/0248573 A1* | 11/2006 | Pannu et al. | 726/1 |
| 2007/0255786 A1* | 11/2007 | Mock et al. | 709/204 |
| 2008/0307053 A1 | 12/2008 | Mitnick et al. | |
| 2009/0112984 A1* | 4/2009 | Anglin et al. | 709/204 |
| 2010/0235313 A1 | 9/2010 | Rea et al. | |
| 2010/0293029 A1* | 11/2010 | Olliphant | 705/9 |
| 2010/0325214 A1* | 12/2010 | Gupta | 709/206 |
| 2011/0078795 A1* | 3/2011 | Liu | 726/23 |
| 2011/0179118 A1* | 7/2011 | Dean et al. | 709/204 |
| 2011/0184943 A1* | 7/2011 | Norton et al. | 707/723 |
| 2011/0252097 A1* | 10/2011 | Walker et al. | 709/206 |
| 2012/0226748 A1* | 9/2012 | Bosworth et al. | 709/204 |
| 2012/0229446 A1* | 9/2012 | Hyndman et al. | 345/419 |
| 2012/0253935 A1* | 10/2012 | Blom | 705/14.58 |

FOREIGN PATENT DOCUMENTS

WO    2009134462 A2    11/2009

OTHER PUBLICATIONS

Balog (Balog, Krisztian, Formal Models for Expert Finding in Enterprise Corpora, 2006, Netherlands Organization for Scientific Research (NWO) project 220-80-001, pp. 43-50).*

(Continued)

*Primary Examiner* — Dustin Nguyen
*Assistant Examiner* — Michael A Keller
(74) *Attorney, Agent, or Firm* — Yee & Associates, P.C.; Parashos T. Kalaitzis

(57) ABSTRACT

A method and apparatus for managing collaborations. Requests are received by a computer for collaboration on a topic. A set of experts is identified by the computer having expertise in the topic for the collaboration and having activity prior to the collaboration relating to the topic to predict a likelihood of participation by the respective expert in the collaboration. The set of experts are identified from searching a number of collections of information.

20 Claims, 5 Drawing Sheets

(56) References Cited

OTHER PUBLICATIONS

Campbell (Campbell, Christopher, Expertise Identification using Email Communications, 2003, IBM Almaden Research Center, pp. 1-4).*

D'Amore (D'Amore, Raymond, Expertise Community Detection, 2004, The MITRE Corporation, pp. 1-2).*

Liu (Liu, Xiaoyong, Finding Experts in Community-Based Question-Answering Services, 2005, pp. 1-2).*

McDonald (McDonald, David, Expertise Recommender: A Flexible Recommendation System and Architecture, 2000, Department of Information and Computer Science University of California Irvine, pp. 1-10).*

Mokus (Mokus, Audris, Expertise Browser: A Quantitative Approach to Identifying Expertise, 2002, Avaya Labs Research, pp. 1-10).*

Pal (Pal, Aditya, Expert Identification in Community Question Answering: Exploring Question Selection Bias, Oct. 2010, GroupLens Research University of Minnesota, pp. 1-4).*

Yimam-Seid (Yimam-Seid, Dawit, Expert Finding Systems for Organizations: Problem and Domain Analysis and the DEMOIR Approach, 2003, Journal of Organizational Computing and Electronic Commerce 13(1) 2003 1-24, Department of Information and Computer Science University of California Irvine, pp. 1-23).*

Zhang (Zhang, Jun, Expertise Networks in Online Communities: Structure and Algorithms, 2007, School of Information University of Michigan, pp. 1-10).*

* cited by examiner

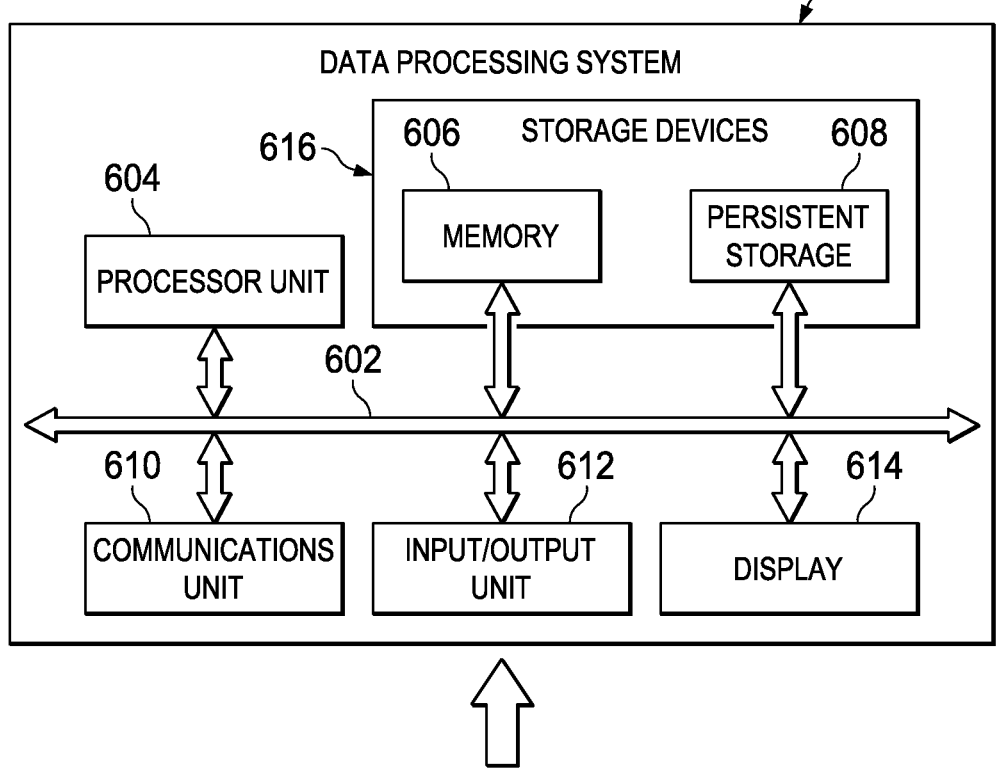
FIG. 6
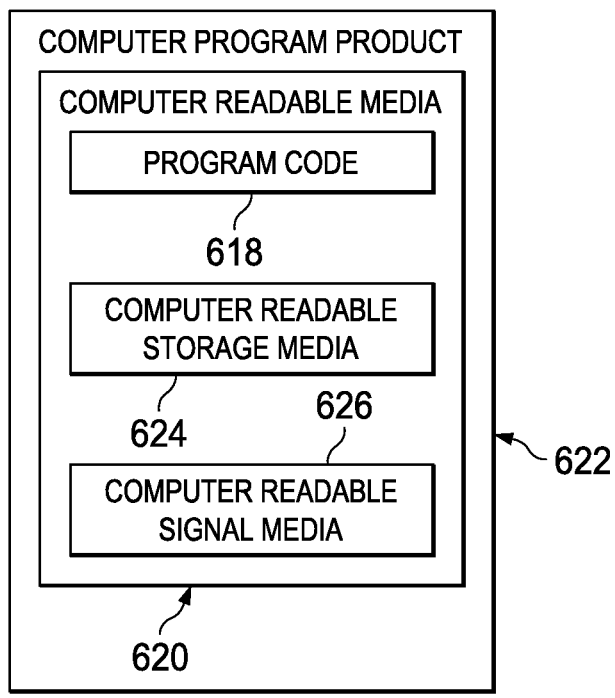

US 8,943,131 B2

PREDICTIVE COLLABORATION MANAGEMENT

BACKGROUND

1. Field

The present disclosure relates generally to an approved data processing system and, more specifically, to a method and apparatus for managing collaboration. Still more particularly, the present disclosure relates to a method and apparatus for selecting participants for a collaboration.

2. Description of the Related Art

Collaboration results when participants work together to achieve a goal. For example, without limitation, answering a question, solving a problem, designing a product, and other suitable goals are examples of results of collaboration. People may collaborate in many different ways. For example, collaboration may occur in in-person meetings, a telephone conference, a video conference, a chat session, a forum thread, email, and/or other suitable ways.

When a user starts the collaboration, the user identifies what people the user would like to participate. In identifying participants for the collaboration, the user may desire to have participants with expertise on the topic of the collaboration.

For example a user may plan a collaboration to discuss new network architecture. The user may select people that the user knows have experience with designing network architectures. Further, the user also may select people who use different types of networks to provide feedback about certain features that may be in the network architecture that is the subject of the collaboration.

The user then sends out invitations to the different participants identified for the collaboration. After the invitations are sent out, the collaboration then begins with the participants working together to discuss the new network architecture.

SUMMARY

In one illustrative embodiment, a method, apparatus, and computer program product for managing collaborations is provided. Requests are received by a computer for collaboration on a topic. A set of experts is identified by the computer having expertise in the topic for the collaboration and having activity prior to the collaboration relating to the topic to predict a likelihood of participation by a respective expert in the collaboration. The set of experts are identified from searching a number of collections of information and the set of experts identified from respective experts have a likelihood of participation that exceeds a threshold level.

BRIEF DESCRIPTION OF THE SEVERAL VIEWS OF THE DRAWINGS

FIG. 6 is an illustration of a data processing system in accordance with an illustrative embodiment.

DETAILED DESCRIPTION

Figure 1:
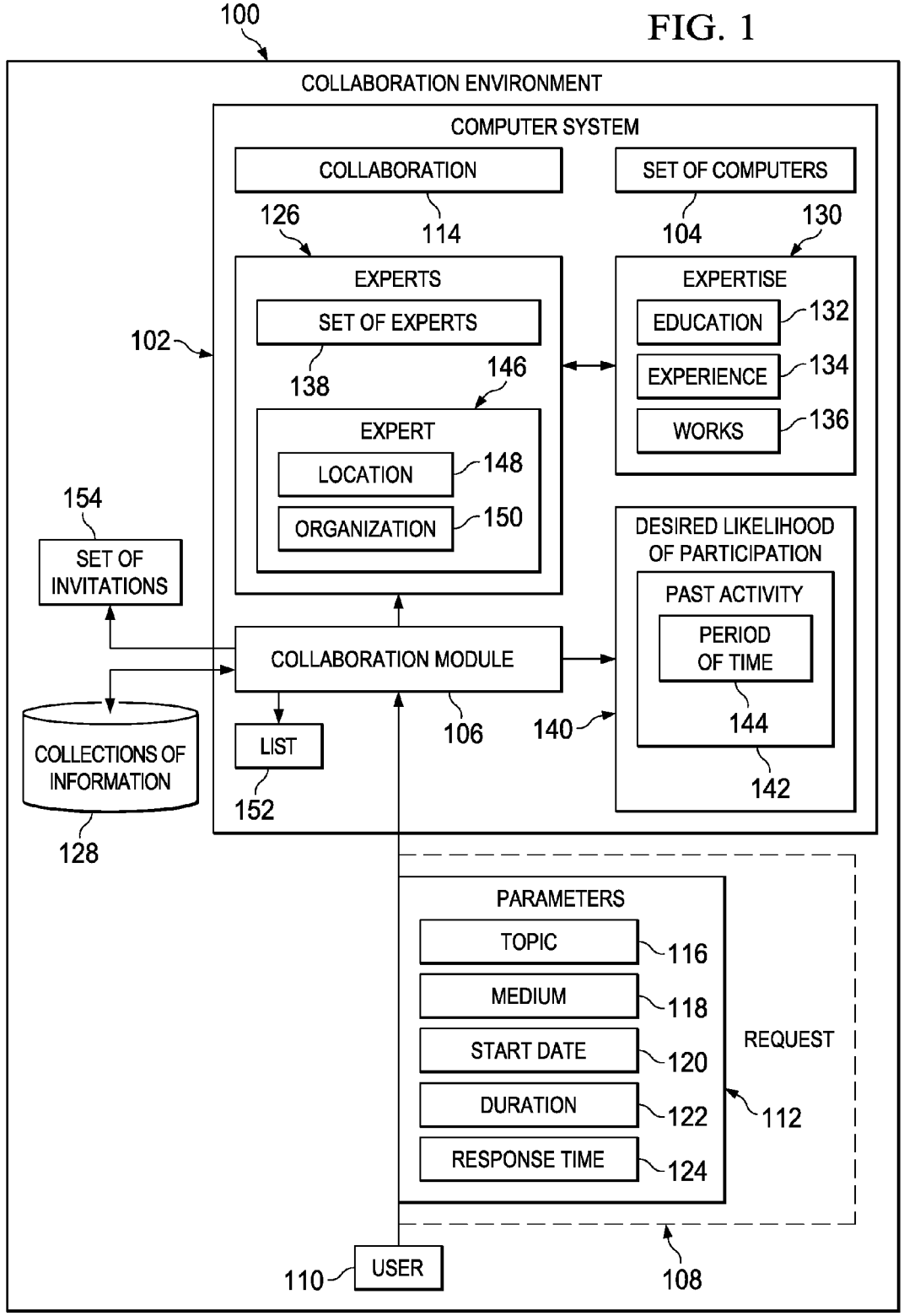
FIG. 1 is an illustration of a collaboration environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain a program for use by or in connection with an instruction processing system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The different illustrative embodiments recognize and take into account a number of different considerations. For example, the different illustrative embodiments recognize and take into account that one difficulty in planning a collaboration is to identify who should be involved in a collaboration. People without expertise in the particular topic for the collaboration may not be able to help as much as desired. Further, the different illustrative embodiments recognize and take into account that some people may not participate actively in a collaboration.

The different illustrative embodiments also recognize and take into account that internal profiles or directories in an organization may be used to identify people with an expertise for the topic of the collaboration. The different illustrative embodiments also recognize and take into account that these profiles may become old or out-dated. In some cases, the profiles for a person may be updated to indicate a new area of expertise. As a result, that person may still be selected for the collaboration even though the person no longer has an expertise in that area.

Thus, the illustrative embodiments provide a method and apparatus for managing collaboration. A computer system receives an identification of a topic for a collaboration. The computer system identifies a set of experts having expertise in the topic for the collaboration. The set of experts is also identified as having past activity relating to the topic indicating a desired likelihood of participation in the collaboration. As used herein, "a set", used with reference to items, means one or more items. For example, "a set of experts" is one or more experts.

With reference now to FIG. 1, an illustration of a collaboration environment is depicted in accordance with an illustrative embodiment. Collaboration environment 100 may be implemented in computer system 102. Computer system 102 comprises set of computers 104. In these illustrative examples, computer system 102 includes collaboration module 106. Collaboration module 106 may be implemented in hardware, software, or a combination of the two.

Collaboration module 106 receives request 108 from user 110. In this illustrative example, request 108 defines parameters 112 for collaboration 114. Parameters 112 includes topic 116. Topic 116 is a topic for collaboration 114. Topic 116 may be a single word, a sentence, a paragraph, or some other description of the subject matter for collaboration 114.

Parameters 112 also may include medium 118, start date 120, duration 122, response time 124, and/or other suitable parameters. Medium 118 is the medium in which collaboration 114 will occur. In other words, medium 118 is where information is exchanged between participants in collaboration 114 when collaboration 114 occurs. Medium 118 may be, for example, without limitation, a meeting room, a voice, a video conference, a chat, an email, a forum, and/or other suitable types of mediums that are suitable for collaboration 114.

In these illustrative examples, collaboration module 106 identifies experts 126. Experts 126 may be identified from searching a number of collections of information. For example, Experts 126 may be identified using collections of information 128. Collections of information 128 may include email databases, chat logs, social networks, internal directories, information from web pages, organizational profiles, and other suitable types of information. For example, chat logs may comprise a set of information provided by Experts 126 during one or more chat sessions. Chat sessions may include, for example, instant messaging sessions, internet relay chat sessions, forum message threads, and any other suitable recorded collaborations.

Experts 126 are identified as people who have expertise 130 that relates to topic 116 for collaboration 114. Expertise 130 may take different forms. For example, expertise 130 may be based on education 132, experience 134, works 136, and/or other suitable types of information that may indicate expertise 130 relating to topic 116. Education may be determined by, for example, college degrees obtained, continuing education courses taken, online courses completed, seminars attended, certifications obtained, and/or other types of education. Experience 134 may include jobs, projects worked, job responsibilities, and/or other information relating to things done by a person. Works 136 may be, for example, without limitation, published papers, speaking engagements, books, journal articles, and/or other suitable types of works generated by the person that may provide information about expertise 130 with respect to topic 116.

In these illustrative examples, collaboration module 106 identifies set of experts 138 from experts 126. Set of experts 138 are one or more experts within experts 126. In some cases, set of experts 138 may be experts 126. Set of experts 138 are identified as experts that have a desired likelihood of participation 140 for collaboration 114.

Identification includes predicting a likelihood of participation by a respective expert in the collaboration. The respective expert is an expert for the topic. The desired likelihood of participation may be indicated using a threshold level. Set of experts 138 identified are experts from experts 126 that have a likelihood of participation that is greater than the threshold level. The threshold level may be used to set a desired likelihood of participation for the search of experts 126.

Identifying set of experts 138 as having a desired likelihood of participation 140 in collaboration 114 is performed by searching experts 126 for experts having past activity 142 that indicates a desired likelihood of participation 140. As depicted, past activity 142 is an activity that occurs prior to collaboration 114. In these illustrative examples, past activity 142 is selected as activity that occurs within period of time 144. In these examples, period of time 144 occurs from a current period of time in which the identification or search is made.

Past activity 142 may include, for example, without limitation, participating in past collaborations, participating in conferences, speaking at meetings, posting in forums, replying to emails, sending emails, participating in telephone conferences, publishing papers, teaching classes, taking classes, and/or other suitable activities. In these illustrative examples, participating in past collaborations may include a set of information provided by experts 126 in prior chat sessions.

Desired likelihood of participation 140 may be selected in a number of different ways. For example, it is often desired that an expert in set of experts 138 is more likely to participate than not. The desired likelihood of participation may be a predication indicated based on a percentage. For example, in some cases, a desired likelihood of participation may be 50 percent. In other cases, the desired likelihood of participation may be selected as 90 percent. These values are examples of threshold levels from which set of experts 138 is identified from predictions of a likelihood of participation.

Further, depending on the expertise of the particular expert, the desired likelihood of participation may be set lower because of the value of that particular expert. As a result, desired likelihood of participation 140 may be different for different experts in experts 126 when selecting set of experts 138.

In some illustrative examples, past activity 142 may reduce a likelihood that a particular expert will participate in a collaboration. For example, expert 146 in experts 126 may be located in location 148 and belong to organization 150. Depending on location 148 and organization 150, desired likelihood of participation 140 may be different. For example, if medium 118 is a meeting in a meeting room and location 148 for expert 146 is 500 miles away from the meeting room, the likelihood that expert 146 will attend or participate in collaboration 114 may be less than if location 148 for expert 146 is in the same building as the meeting room.

As another example, if organization 150 for expert 146 is different from the organization from other experts in the meeting, a conflict may be present. For example, the two organizations may be competitors and agreements to exchange information may be not present. With this conflict, it is less likely that expert 146 will participate in the collaboration. Further, collaboration module 106 may indicate that desired likelihood of participation 140 is non-existent or low enough that expert 146 is not included in set of experts 138.

Collaboration module 106 may identify experts 126 in set of experts 138 in response to request 108 from user 110. Further, collaboration module 106 may perform identifying experts 126 from collections of information 128 on a periodic basis. As a result, experts 126 may be updated, as well as set of experts 138.

In some illustrative examples, when experts 126 are identified for topic 116, list 152 may be generated for experts 126. Collaboration module 106 may then update list 152 periodically by searching collections of information 128. In this manner, if topic 116 is used again at a later time, the time needed to identify set of experts 138 may be reduced.

Further, list 152 may be filtered based on different parameters. For example, locations and organizations, such as location 148 and organization 150 for expert 146 may be used as parameters to filter list 152. This filtering may be based on parameters such as at least one of locations and organizations.

As used herein, the phrase "at least one of", when used with a list of items, means different combinations of one or more of the listed items may be used and only one of each item in the list is needed. For example, "at least one of item A, item B, and item C" may include, for example, without limitation, item A, or item A and item B. This example also may include item A, item B, and item C, or item B and item C.

When set of experts 138 are identified, collaboration module 106 also may send set of invitations 154 to set of experts 138 for collaboration 114.

In this manner, the different illustrative embodiments may more efficiently identify experts for a collaboration. The experts identified using different illustrative embodiments may increase a likelihood of participation for experts who receive invitations to participate in a collaboration.

The illustration of collaboration environment 100 in FIG. 1 is not meant to imply physical or architectural limitations to the manner in which an illustrative embodiment may be implemented. Other components in addition to, and/or in place of, the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, collaboration module 106 may perform searching by sending queries to a search engine. In other illustrative examples, collaboration module 106 also may include a search engine to search collections of information 128. In still other illustrative examples, filtering may be performed with other parameters in addition to, and/or in place of, location 148 and organization 150. For example, filtering also may include schools attended, amount of experience, and other suitable parameters. The filtering may select particular experts that meet thresholds for the parameters. In other illustrative examples, the filtering may organize the list in order based on the particular parameters.

Figure 2:
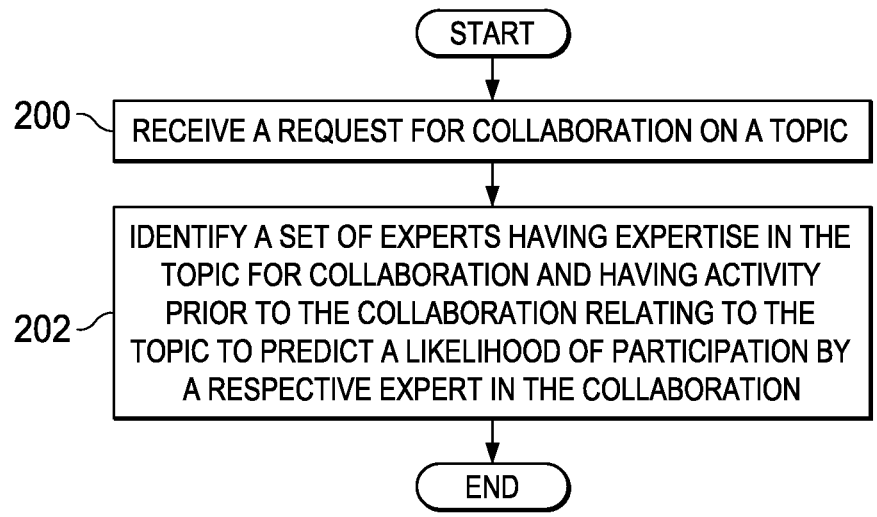
FIG. 2 is a flowchart of a process for managing collaborations in accordance with an illustrative embodiment.

With reference now to FIG. 2, a flowchart of a process for managing collaborations is depicted in accordance with an illustrative embodiment. The steps in FIG. 2 may be implemented in collaboration environment 100 in FIG. 1. In particular, the steps may be implemented in software, hardware, or a combination of the two in collaboration module 106 in FIG. 1.

The process begins by receiving a request for collaboration on a topic (step 200). The request may be received from a user, such as user 110 in FIG. 1. In these illustrative examples, the request includes parameters. The topic, medium, start date, and duration are examples of some parameters that may be included in the request.

The process identifies a set of experts having expertise in the topic for collaboration and having activity prior to the collaboration relating to the topic to predict a likelihood of participation by a respective expert in the collaboration (step 202) with the process terminating thereafter. The set of experts are identified from respective experts having a likelihood of participation that exceeds a threshold level. The process may send invitations to those experts identified in step 202. In other illustrative examples, the set of experts may be displayed in a list to the user. The user may then select experts from the list for the collaboration. For example, a list of 20 experts may be displayed to the user and the user may only desire to have 10 participants in the collaboration. The user may then select the 10 participants from the list and initiate the sending of invitations to those selected experts in the list.

Figure 3:
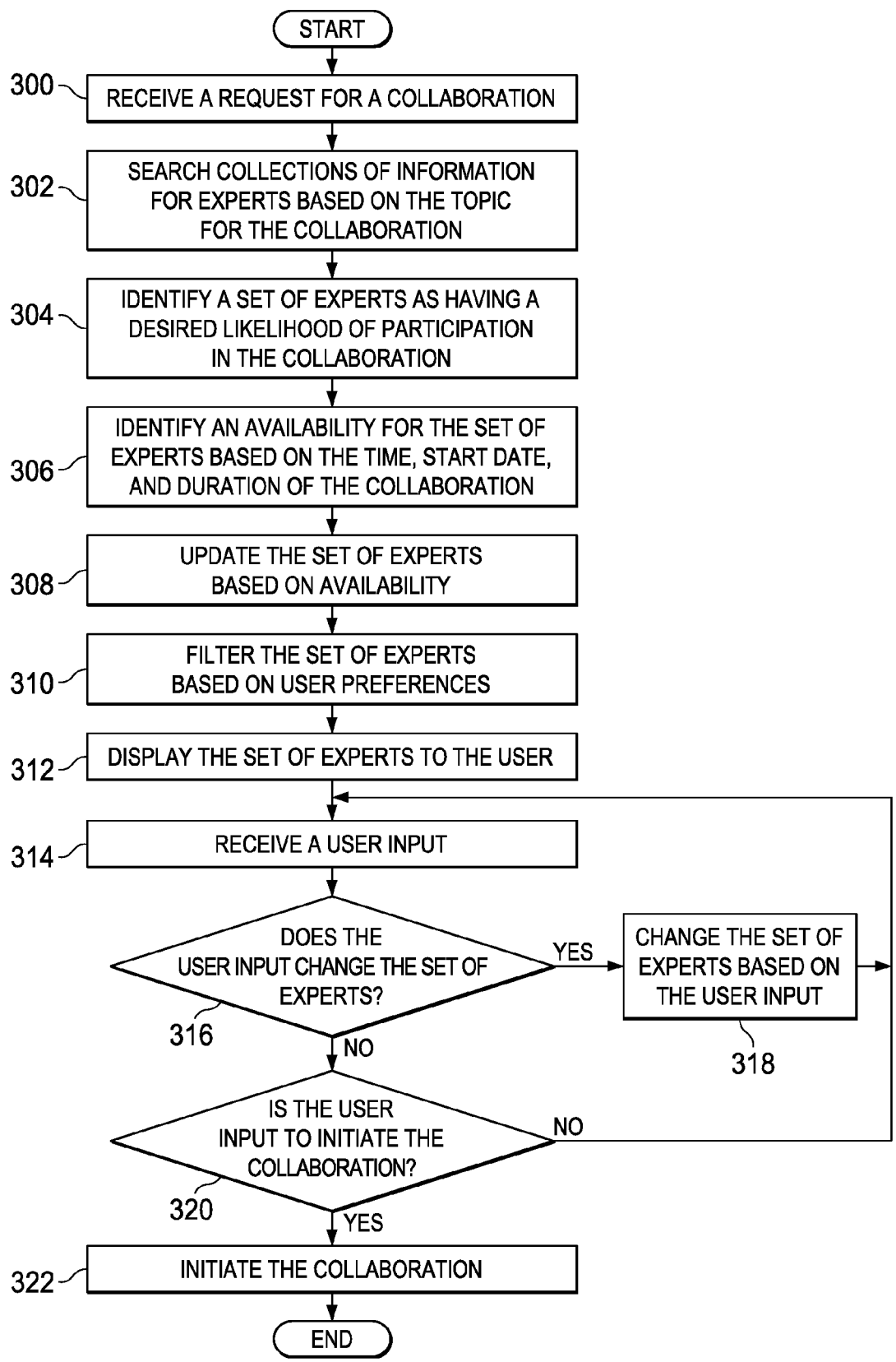
FIG. 3 is a flowchart of a process for managing a collaboration in accordance with an illustrative embodiment.

With reference now to FIG. 3, a flowchart of a process for managing a collaboration is depicted in accordance with an illustrative embodiment. The steps in FIG. 3 may be implemented in collaboration environment 100 in FIG. 1. In particular, the steps may be implemented in software, hardware, or a combination of the two in collaboration module 106 in FIG. 1.

The process begins by receiving a request for a collaboration (step 300). The process then searches collections of information for experts based on the topic for the collaboration (step 302). In step 302, the process searches for people who have expertise in the topic in the collections of information to identify the experts. A set of experts are identified as having a desired likelihood of participation in the collaboration (step 304). In step 304, the process looks for activity prior to the collaboration relating the topic. This activity is used to determine whether a desired likelihood of participation in the collaboration is present. This step may be performed by predicting a likelihood of participation by an expert. The likelihood of participation is compared to a threshold level. If the likelihood of participation exceeds the threshold level, the expert is included in the set of experts.

The activity may be within a selected period of time of the current time. The likelihood of participation may be identified using a policy. The policy may provide values for different types of activities and/or when the activities occur. For example, participation in prior collaboration on the same topic may be given a higher value than published papers on the topic. Activities occurring more recently also may be given a higher value than activities occurring at earlier times.

The process then optionally identifies an availability for the set of experts based on the time, start date, and duration of the collaboration (step 306). In this illustrative example, step 306 may include searching or checking calendars that may be published or made available by the experts in the set of experts. The process then updates the set of experts based on availability (step 308). In step 308, experts may be removed if their availability does not match the start date and duration of the collaboration. Depending on the collaboration, the availability of an expert may not need to entirely coincide with the duration of the collaboration. A partial overlap with the collaboration may be sufficient to not remove an expert from the set of experts.

The process then filters the set of experts based on user preferences (step 310). For example, the set of experts may be filtered to remove experts not known to the user. As another example, the set of experts may be filtered to remove experts that have not had communications with the user. In yet another example, a filter may select experts based on their location. The filtering also may include placing the set of experts in an order based on different parameters. For example, the order may be based on distance to the location of the user, distance to a location for the collaboration, date of last activity relative to the topic, and other suitable parameters. These and other filters may be used individually or in combination to filter the set of experts in step 310.

The process then displays the set of experts to the user (step 312). The process then receives a user input (step 314). A determination is then made as to whether the user input changes the set of experts (step 316). If the user input is to change the set of experts, the process changes the set of experts based on the user input (step 318). In step 318, the user may add or remove experts in the set of experts. For example, a user may add an expert not displayed in the list that the user wishes to have participate in the collaboration. The user also may remove experts from the list if more experts are present in the set of experts than needed. The process then returns to step 314.

With reference again to step 316, if the user input is not to change the set of experts, the process determines whether the user input is to initiate the collaboration (step 320). If the user input is to initiate the collaboration, the process then initiates the collaboration (step 322) with the process terminating thereafter. The collaboration may be stated in a number of different ways. For example, invitations may be sent to the set of experts, a forum may be created, a room may be reserved, a telephone conference number may be set up, a video conference may be set up, and other suitable steps may be taken to initiate the collaboration.

With reference again to step 320, if the user input does not initiate the collaboration, the process then returns to step 314.

Figure 4:
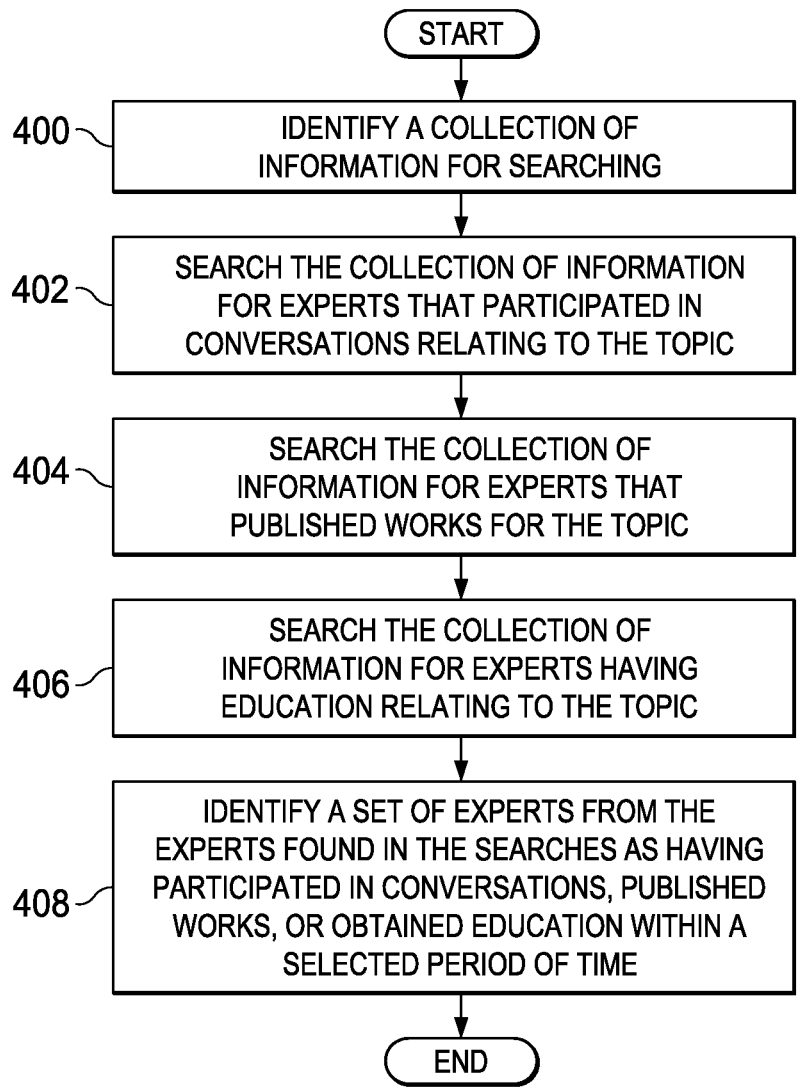
FIG. 4 is a flowchart of a process for identifying experts in accordance with an illustrative embodiment.

Turning next to FIG. 4, a flowchart of a process for identifying experts is depicted in accordance with an illustrative embodiment. The process illustrated in FIG. 4 is an example of an implementation for step 202 in FIG. 2.

The process begins by identifying a collection of information for searching (step 400). The process then searches the collection of information for experts that participated in conversations relating to the topic (step 402). The process then searches the collection of information for experts that published works for the topic (step 404).

The process then searches the collection of information for experts having education relating to the topic (step 406). The process then identifies a set of experts from the experts found in the searches as having participated in conversations, published works, or obtained education within a selected period of time (step 408) with the process terminating thereafter. The selected period of time may be different for different activities. For example, the period of time for participating in conversations may be smaller than the period of time for when education was obtained. Of course, other activities also may be taken into account in addition to, and/or in place of, the ones listed above.

This process may be performed for each collection of information that may be available or may be selected by a user. In this manner, the process illustrated in FIG. 4 is an example of one manner in which activity prior to the collaboration in which the activity relates to the topic may be used to identify a desired likelihood of participation in the collaboration.

Figure 5:
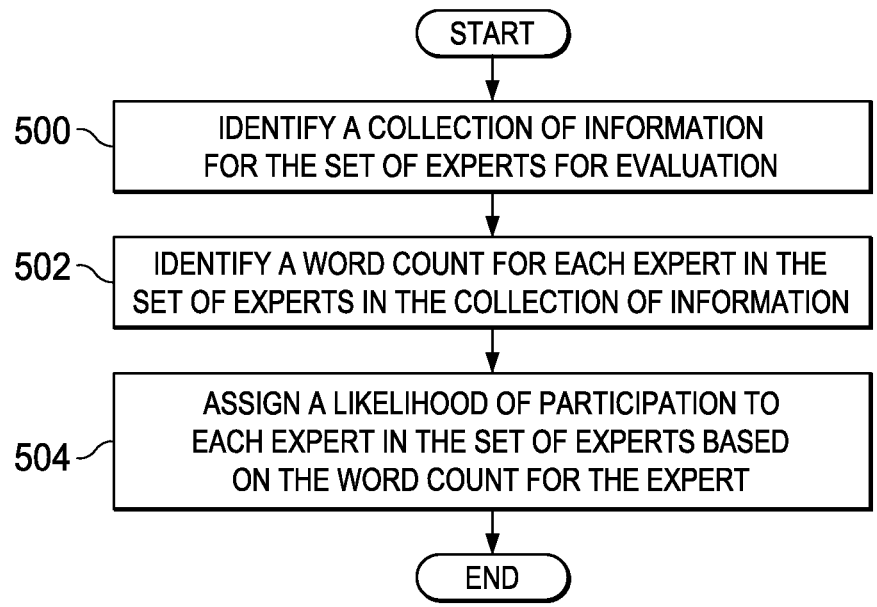
FIG. 5 is a flowchart of a process for identifying a likelihood of participation in a collaboration in accordance with an illustrative embodiment.

In FIG. 5, a flowchart of a process for identifying a likelihood of participation in a collaboration is depicted in accordance with an illustrative embodiment. The process in FIG. 5 may be implemented in computer system 102 and, more specifically, in collaboration module 106 in FIG. 1.

The process begins by identifying a collection of information for the set of experts for evaluation (step 500). In this example, the collection of information may be prior participation in a forum, email, chat session, or other communication for a prior collaboration on the topic. The process then identifies a word count for each expert in the set of experts in the collection of information (step 502). The process then assigns a likelihood of participation to each expert in the set of experts based on the word count for the expert (step 504) with the process terminating thereafter. The likelihood of participation is a prediction of how likely a respective expert will participate in the collaboration.

In this example, the level of contribution by an expert is used to generate an indication of a likelihood of participation in a collaboration. Further, this process may be applied to collaborations on other topics if collections of information cannot be found for the current topic. Additionally, processes may be used to determine whether the contributions in these collections were relevant depending on the particular implementation. This determination may be made by analyzing sentences and paragraphs to determine whether particular key words relating to the topic are present.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more computer usable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one illustrative example of managing a collaboration, a user is responsible for arranging a collaboration in the form of a customer briefing between the user's company and a customer. The user identifies a set of meetings that are to take place before, during, and after the customer briefing. Each meeting comprises a number of topics that will be covered during the meeting, a starting time and duration of the meeting, and an indication as to whether attendance is mandatory. In this illustrative example, a topic about briefing logistics may be optional for one expert and a topic of the briefing may be required for another expert.

The user also identifies a set of rules limiting which experts can attend the customer briefing. For example, the customer briefing may include legal restrictions. These identified legal restrictions may include a requirement that the participants sign a non-disclosure agreement, a requirement that the participants not be working on a particular product or technology, a requirement that the participants have a particular certification, or other suitable legal requirements placed on participants of a customer briefing. Further, the rules limiting which experts can attend may include a specific list of experts who may or may not attend. This list may comprise names of experts identified by the customer, the user, or by someone within the user's company tasked to make such decisions.

The process then identifies a set of experts for the customer briefing. The set of experts is identified based on an identification of expertise in the discussion topics, an identification of adherence to the identified rules, an identification of a relationship with the owner of the activity, an identification of a relationship with the customer, and an availability of the expert to attend mandatory meetings. The availability may be the likelihood that the expert will participate in this type of collaboration.

The identifications performed by user in this illustrative example are not meant to imply that only the user may perform the identifications. For example, in some illustrative examples anyone attending the customer briefing may also perform the identification steps. In still other illustrative examples, a template may be used by the process to perform the above mentioned identification steps.

The steps of identifying a set of experts may be performed by the process on demand before, during, and after the customer briefing. For example, after the initial identification of the set of experts, a change may occur that affects which experts should be in the set of experts. The change may be responsive to a request to remove or add an expert to the set of experts, or a change in an experts status regarding one of the rules, or any other suitable change related to which exerts should be in the set of experts. The process for identifying a set of topic experts for a customer briefing is not meant to be restricted to customer briefings. For example, the process for identifying a set of topic experts can also be used for identifying a set of experts who can answer a particular question.

Turning now to FIG. 6, an illustration of a data processing system is depicted in accordance with an illustrative embodiment. In this illustrative example, data processing system 600 includes communications framework 602, which provides communications between processor unit 604, memory 606, persistent storage 608, communications unit 610, input/output (I/O) unit 612, and display 614. Data processing system 600 is an example of a data processing system that may be use dot implemented one or more computers in computer system 102 in FIG. 1.

Processor unit 604 serves to process instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. In these illustrative examples, the instructions are in a functional form on persistent storage 608. These instructions may be loaded into memory 606 for processing by processor unit 604. The processes of the different embodiments may be performed by processor unit 604 using computer implemented instructions, which may be located in a memory, such as memory 606.

These instructions are referred to as program code, computer usable program code, or computer readable program code that may be read and processed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for processing by processor unit 604. Program code 618 and computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600.

In some instances, computer readable storage media 624 may not be removable from data processing system 600. In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications framework 602 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 606, or a cache, such as found in an interface and memory controller hub that may be present in communications framework 602.

Thus, the illustrative embodiments provide a method and apparatus for managing collaborations. A request is received for a collaboration on a topic. A set of experts is identified as having expertise in the topic for the collaboration and having activity prior to the collaboration relating to the topic indicating a desired level of participation in the collaboration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method in a computer system for managing collaborations, the method comprising:
  receiving, by the computer system, a request for collaboration on a topic;
  identifying, by the computer system for a collaboration, a plurality of experts that have expertise in the topic, wherein at least two of the plurality of experts have a different one of a plurality of different threshold levels of a likelihood of participation in the collaboration, wherein the likelihood of participation in the collaboration is the percentage based estimation that the expert will participate in the collaboration based on a relative location of the expert to a collaboration site and whether the expert belongs to an organization hosting the collaboration, and wherein the plurality of experts are identified using a number of collections of information;

setting the plurality of different threshold levels according to a level of expertise of the plurality of experts; and identifying, by the computer system, particular experts of the plurality of experts that have a respective particular likelihood of participation that exceeds one of the plurality of different threshold levels.

2. The method of claim 1, wherein the identifying step comprises:
identifying, by the computer system, the particular experts as ones that have activity relating to the topic within a period of time from a current time at which an identification is made, wherein, for each one of the particular experts, the amount of activity of the particular expert is used to determine the likelihood of participation of the particular expert.

3. The method of claim 2, wherein the activity is publishing papers, and wherein the published papers are related to the topic.

4. The method of claim 1, wherein the identifying step comprises:
searching the number of collections of information periodically to identify the particular experts that have activity relating to the topic within a period of time to predict the respective particular likelihood of participation of each one of the plurality of experts.

5. The method of claim 1, wherein the number of collections of information comprises prior communications by a user sending the request.

6. The method of claim 1 further comprising:
sending out a set of invitations for the collaboration to the particular experts.

7. The method according to claim 1, wherein first ones of the plurality of experts that have a first level of expertise have a first one of the plurality of different threshold levels and second ones of the plurality of experts that have a second level of expertise have a second one of the plurality of different threshold levels, and wherein the first one of the plurality of different threshold levels is higher than the second one of the plurality of different threshold levels, and further wherein the first ones of the plurality of experts have a greater level of expertise in the topic than the second ones of the plurality of experts.

8. A computer system for managing collaborations, the computer system comprising:
one or more processors, one or more computer-readable memories and one or more computer-readable storage devices, and program instructions, stored on at least one of the one or more storage devices for execution by at least one of the one or more processors via at least one of the one or more memories, the program instructions comprising:

program instructions to receive a request for collaboration on a topic;

program instructions to identify, for a collaboration, a plurality of experts that have expertise in the topic, wherein at least two of the plurality of experts have a different one of a plurality of different threshold levels of a likelihood of participation in the collaboration, wherein the likelihood of participation in the collaboration is the percentage based estimation that the expert will participate in the collaboration based on a relative location of the expert to a collaboration site and whether the expert belongs to an organization hosting the collaboration, and wherein the plurality of experts are identified using a number of collections of information;

program instructions to set the plurality of different threshold levels according to a level of expertise of the plurality of experts; and program instructions to identify particular experts of the plurality of experts that have a respective particular likelihood of participation that exceeds one of the plurality of different threshold levels.

9. The computer system of claim 8, wherein the program instructions to identify comprise:
program instructions to identify the particular experts as ones that have activity relating to the topic within a period of time from a current time at which an identification is made, wherein, for each one of the particular experts, the amount of activity of the particular expert is used to determine the likelihood of participation of the particular expert.

10. The computer system of claim 9, wherein the activity is publishing papers, and wherein the published papers are related to the topic.

11. The computer system of claim 8, wherein the program instructions to identify comprise:
program instructions to search the number of collections of information periodically to identify the particular experts that have activity relating to the topic within a period of time to predict the respective particular likelihood of participation of each one of the plurality of experts.

12. The computer system of claim 8, wherein the number of collections of information comprises prior communications by a user sending the request.

13. The computer system of claim 8, wherein first ones of the plurality of experts that have a first level of expertise have a first one of the plurality of different threshold levels and second ones of the plurality of experts that have a second level of expertise have a second one of the plurality of different threshold levels, and wherein the first one of the plurality of different threshold levels is higher than the second one of the plurality of different threshold levels, and further wherein the first ones of the plurality of experts have a greater level of expertise in the topic than the second ones of the plurality of experts.

14. A computer program product for managing collaborations, the computer program product comprising:
one or more computer-readable tangible storage devices, and program instructions stored on the storage devices, the program instructions comprising:

program instructions to receive a request for collaboration on a topic;

program instructions to identify, for a collaboration, a plurality of experts that have expertise in the topic, wherein at least two of the plurality of experts have a different one of a plurality of different threshold levels of a likelihood of participation in the collaboration, wherein the likelihood of participation in the collaboration is the percentage based estimation that the expert will participate in the collaboration based on a relative location of the expert to a collaboration site and whether the expert belongs to an organization hosting the collaboration, and wherein the plurality of experts are identified using a number of collections of information;

program instructions to set the plurality of different threshold levels according to a level of expertise of the plurality of experts; and program instructions to identify particular experts of the plurality of experts that have a respective particular likelihood of participation that exceeds one of the plurality of different threshold levels.

15. The computer program product of claim 14, wherein the program instructions to identify comprise:
program instructions to identify the particular experts as ones that have activity relating to the topic within a period of time from a current time at which an identification is made, wherein, for each one of the particular experts, the amount of activity of the particular expert is used to determine the likelihood of participation of the particular expert.

16. The computer program product of claim 15, wherein the activity is publishing papers, and wherein the published papers are related to the topic.

17. The computer program product of claim 14, wherein the program instructions to identify comprise:
program instructions to search the number of collections of information periodically to identify the particular experts that have activity relating to the topic within a period of time to predict the respective particular likelihood of participation of each one of the plurality of experts.

18. The computer program product of claim 14, wherein the number of collections of information comprises prior communications by a user sending the request.

19. The computer program product of claim 14 further comprising:
program instructions to send out a set of invitations for the collaboration to the particular experts.

20. The computer program product of claim 14, wherein first ones of the plurality of experts that have a first level of expertise have a first one of the plurality of different threshold levels and second ones of the plurality of experts that have a second level of expertise have a second one of the plurality of different threshold levels, and wherein the first one of the plurality of different threshold levels is higher than the second one of the plurality of different threshold levels, and further wherein the first ones of the plurality of experts have a greater level of expertise in the topic than the second ones of the plurality of experts.

* * * * *